United States Patent
Toishita (10) Patent No.: US 8,743,260 B2
(45) Date of Patent: Jun. 3, 2014

(54) INFORMATION PROCESSING APPARATUS, IMAGE PICKUP APPARATUS AND METHOD FOR SETTING GUI DISPLAY TO PROVIDE EASIER VISUAL RELATIONSHIP OF SETTABLE ITEMS

(75) Inventor: Wataru Toishita, Kanagawa (JP)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 13/439,500

(22) Filed: Apr. 4, 2012

(65) Prior Publication Data
US 2012/0257078 A1 Oct. 11, 2012

(30) Foreign Application Priority Data
Apr. 8, 2011 (JP) .................................. 2011-086601

(51) Int. Cl.
*H04N 5/222* (2006.01)
*G06F 3/00* (2006.01)

(52) U.S. Cl.
USPC ...................................... 348/333.02; 715/722

(58) Field of Classification Search
USPC .......... 348/333.02, 333.01; 386/282; 715/722
See application file for complete search history.

(56) References Cited

U.S. PATENT DOCUMENTS

| 2008/0247726 A1* | 10/2008 | Lee et al. ........................ 386/52 |
| 2009/0040357 A1* | 2/2009 | Ichii et al. ................. 348/333.02 |
| 2010/0235007 A1* | 9/2010 | Constien et al. .............. 700/291 |
| 2013/0148001 A1* | 6/2013 | Nakano .................... 348/333.04 |

FOREIGN PATENT DOCUMENTS

JP 10-126673 5/1998

* cited by examiner

*Primary Examiner* — Tuan Ho
*Assistant Examiner* — Shahbaz Nazrul
(74) *Attorney, Agent, or Firm* — Frommer Lawrence & Haug LLP (57) ABSTRACT

An information processing apparatus including: a GUI generation unit configured to generate GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged; and a display processing unit configured to display the generated GUI data on the screen.

6 Claims, 6 Drawing Sheets

INFORMATION PROCESSING APPARATUS, IMAGE PICKUP APPARATUS AND METHOD FOR SETTING GUI DISPLAY TO PROVIDE EASIER VISUAL RELATIONSHIP OF SETTABLE ITEMS

BACKGROUND

The present disclosure relates to an information processing apparatus, a GUI display method, and an image pickup apparatus with which various setting item values can be checked and set using a GUI.

Regarding multifunctional cameras such as a video camera for a broadcast station and a camera-integrated video tape recorder, there are a considerable number of types of setting items. From the past, settings of the setting items and a check of statuses have been carried out through a screen displayed in a monitor or viewfinder provided in the camera.

For example, in an image pickup system disclosed in Japanese Patent Application Laid-open No, Hei 10-126673 (paragraph [0220], FIG. 17), a parameter setting window for setting parameters of various functions such as knee processing and auto iris is adopted. In such a parameter setting window, functionally-similar items, frequently-used items, and the like are collectively displayed in the same window.

SUMMARY

With the existing setting GUI, however, although a plurality of setting items having some kind of a relationship are displayed on a single screen at the same time, it has been difficult to grasp a content of the relationship of the setting items at a glance. Accordingly, an additional improvement in operability when checking and changing settings has been demanded.

In view of the circumstances as described above, there is a need for an information processing apparatus, a setting GUI display method, and an image pickup apparatus with which operability in checking and changing settings can be additionally improved.

According to an embodiment of the present disclosure, there is provided an information processing apparatus including a GUI generation unit and a display processing unit. The GUI generation unit is configured to generate GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the system corresponding to at least one of the lines are displayed on the line are arranged. The display processing unit is configured to display the generated GUI data on the screen.

In the embodiment of the present disclosure, relationships among the processing systems and the setting items can be viewed panoramically, and operability in checking and changing settings can be additionally improved.

The GUI generation unit may generate GUI data that expresses a fact that common information is to be a processing target of the plurality of processing systems by a branch of the lines.

The GUI generation unit may arrange the block of the setting item for which a common setting value needs to be set among the plurality of branched processing systems on a line right before the line is branched into a line of each of the processing systems. With this structure, a user can easily grasp the setting items for which a common setting value needs to be set based on which block of the setting item is arranged on what line.

The GUI generation unit may arrange the block of the setting item common among the plurality of processing systems such that the block crosses the plurality of lines respectively corresponding to the plurality of processing systems. With this structure, the setting value of the setting item common among the plurality of processing systems can be checked at a glance while comparing them.

The GUI generation unit may display a setting value of each of the processing systems in the block of the setting item common among the plurality of processing systems.

According to another embodiment of the present disclosure, there is provided a setting GUI display method, including: generating, by a GUI generation unit, GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged; and displaying, by a display processing unit, the generated GUI data on the screen.

According to another embodiment of the present disclosure, there is provided an image pickup apparatus including an image pickup unit, a GUI generation unit, and a display processing unit. The image pickup unit is configured to pick up an image of an object. The GUI generation unit is configured to generate GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged. The display processing unit is configured to display the generated GUI data on the screen.

As described above, according to the embodiments of the present disclosure, operability in checking and changing settings can be additionally improved.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

<First Embodiment>

In a first embodiment, an information processing apparatus according to the present disclosure is applied to an image pickup apparatus.

Figure 1:
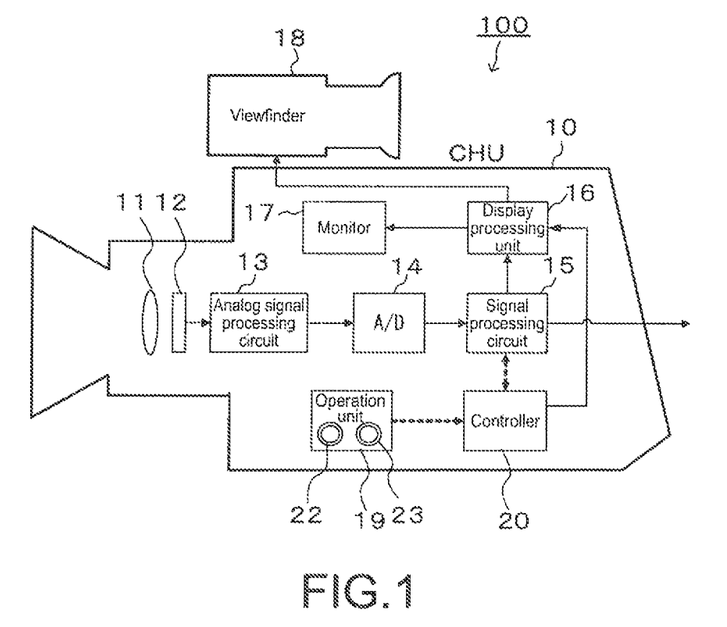
FIG. 1 is a block diagram showing a structure of an image pickup apparatus according to a first embodiment of the present disclosure.

FIG. 1 is a block diagram showing a structure of the image pickup apparatus according to the first embodiment.

As shown in FIG. 1, the image pickup apparatus 100 is constituted of a CHU (Camera Head Unit) 10.

The CHU 10 includes a lens 11, an image pickup device 12, an analog signal processing circuit 13, an A/D conversion unit 14, a signal processing circuit 15, a display processing unit 16, a monitor 17, a viewfinder 18, an operation unit 19, and a controller 20 (GUI generation unit). Although not shown, the CHU 10 also includes a microphone, an A/D conversion unit of an audio system, and a signal processing circuit of the audio system.

The lens 11 takes in object light into the CHU 10. The image pickup device 12 photo-electrically converts the object light taken in by the lens 11 to obtain a video signal. The image pickup device 12 is constituted of, for example, a CCD (Charge Coupled Device).

The analog signal processing circuit 13 includes a CDS (Correlated Double Sampling) circuit that removes reset noises included in a video signal output from the image pickup device 12 and an AGC (Automatic Gain Control) circuit that adjusts gains.

The A/D conversion unit 14 converts the video signal processing in the analog signal processing circuit 13 into a digital video signal and outputs it. The signal processing circuit 15 subjects the digitally-converted video signal to a gamma correction, a knee correction, matrix processing, and the like.

It should be noted that although a case where the image pickup device 12 is constituted of a CCD is assumed in this example, the image pickup device 12 may be constituted of a CMOS (Complementary Metal Oxide Semiconductor), and in that case, processing up to the A/D conversion unit 14 is carried out in the image pickup device 12.

The video signal processed in the signal processing circuit 15 is output to, for example, an external storage apparatus and also to the display processing unit 16. Under control of the controller 20, the display processing unit 16 independently carries out processing optimal for monitoring on the video signal and outputs it to the monitor 17 and the viewfinder 18. As a result, the user can view an image that is being taken through the monitor 17 and the viewfinder 18 in a format optimal for monitoring.

The operation unit 19 receives instructions from the user for operations to the CHU 10 and for various settings and supplies them to the controller 20. The controller 20 is capable of generating, as well as collectively control the CHU 10, display data for a GUI screen that is used for checking and changing values of various setting items in the CHU 10 and outputting the data to the display processing unit 16 in place of the video signal being taken.

[Setting GUI]

The number of setting items in the image pickup apparatus 100 has increased tremendously due to multifunction of the image pickup apparatus 100. In the existing setting GUI (Graphical User Interface), such a large number of setting items are often displayed by displaying a plurality of setting items having some kind of a relationship at the same time on a single screen, for example. However, even though the user can recognize that the plurality of setting items provided on a single screen have some kind of a relationship, it is difficult for the user to grasp the content of the relationship.

In this regard, in the image pickup apparatus 100 of this embodiment, a setting GUI for setting and checking various setting items is structured as follows. Hereinafter, the setting GUI adopted in this embodiment will be described while taking a video output system as an example.

Figure 2:
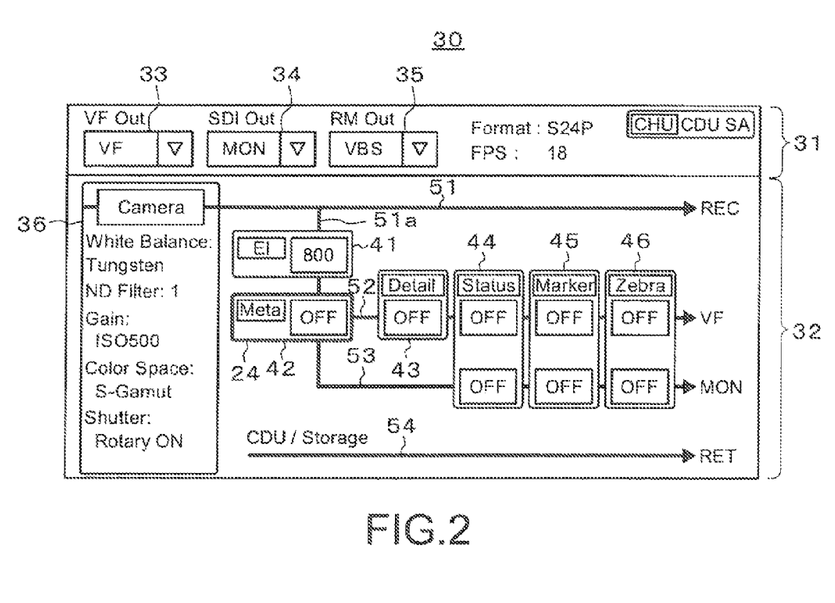
FIG. 2 is a diagram showing a part of a setting GUI adopted in the image pickup apparatus according to the first embodiment.

FIG. 2 is a diagram. Showing a part of the setting GUI of a video output system that is adopted in the image pickup apparatus 100 of this embodiment.

The setting GUI 30 is mainly constituted of an output terminal allocation area 31 and a setting item display area 32.

In the output terminal allocation area 31, a VF (Viewfinder) output terminal allocation portion 33, an SDI (Serial Digital Interface) output terminal allocation portion 34, and an RM (Remote Control Unit) output terminal allocation portion 35 are arranged.

The VF output terminal allocation portion 33 is a selection menu with which the user can allocate one of a plurality of predetermined output terminals to a terminal described as "VF output". It should be noted that a VF (Viewfinder) output terminal is allocated in this example.

The SDI output terminal allocation portion 34 is a selection menu with which the user can allocate one of the plurality of predetermined output terminals to a terminal described as "SDI output". It should be noted that a MON (Monitor) output terminal is allocated in this example.

The RM output terminal allocation portion 35 is a selection menu with which the user can allocate one of the plurality of predetermined output terminals to a terminal described as "RM output". It should be noted that a VBS (Video Burst Signal) output terminal is allocated in this example. VBS is a synchronization signal.

In addition to the output terminal allocation portions 33 to 35, information on a transmission rate and information on an image pickup rate are also displayed in the output terminal allocation area 31.

Next, the setting item display area 32 will be described.

In the description in the setting item display area 32, "REC" refers to a processing system of a video signal with respect to an external storage apparatus (hereinafter, referred to as "main processing system"). "VF" refers to a processing system of a video signal with respect to the viewfinder 18 (hereinafter, referred to as "VF processing system"). "MON" refers to a processing system of a video signal with respect to the monitor 17 (hereinafter, referred to as "MON processing system"). "RET" refers to a processing system of a video signal from an external CDU (Color Development Unit) or storage apparatus to the monitor 17 and the viewfinder 18 (hereinafter, referred to as "RET processing system"). CDU will be described later.

The left-hand side of the setting item display area 32 is a camera image pickup condition display area 36. In the camera image pickup condition display area 36, setting values of, for example, white balance, ND filter, gain, color space, and shutter are displayed.

In the setting GUI 30, in principle, one of biaxial directions of ordinate and abscissa axes (e.g., abscissa direction) orthogonal to each other on a screen is allocated as a signal-flowing direction. The processing systems are respectively expressed as lines 51 to 54 illustrated in parallel with one another along one of the biaxial directions (e.g., abscissa direction) to which the signal-flowing direction is allocated on the screen. Here, the "processing systems" refer to one or more processing carried out on information on a signal and the like before the information is eventually or intermediately output. A processing order of the one or more processing does not necessarily need to be determined. The lines 51 to 54 respectively corresponding to the processing systems are arranged while being deviated from one another in the other axial direction (e.g. ordinate direction).

Hereinafter, the line 51 expressing the main processing system will be referred to as "main line 51", the line 52 expressing the VF processing system will be referred to as "VF line 52", and the line 53 expressing the MON processing system will be referred to as "MON line 53".

A common signal may be a processing target of a plurality of processing systems. In such a case, a relationship between the signal and each processing system and a relationship among the processing systems are expressed by a branch of the lines. For example, since an original video signal as a target of the main processing system, the VF processing system, and the MON processing system is a common signal, a longitudinal line 51*a* branches from the main line 51, and the VF line 52 and the MON line 53 branch from the longitudinal line 51*a*.

Further, one or more blocks in which a name and setting value of each setting item in the processing system are described are arranged on the lines expressing the processing systems. Due to restrictions on a screen space and for preventing the appearance from becoming complex, only blocks 41 to 46 corresponding to the setting items of a part of the processing systems out of the 4 processing systems are displayed in the setting item display area 32 of the setting GUI 30. For example, in the setting GUI 30 shown in the figure, only the plurality of blocks 41 to 46 corresponding to the plurality of setting items in the VF processing system and the MON processing system are displayed. The setting item display area 32 provided at the center of the setting GUI 30 is scrolled longitudinally by an operation of the operation unit 19 provided in the CHU 10, for example. By the scroll of the setting GUI 30, the processing systems for which the blocks are displayed are switched.

There are the following setting items for the VF processing system and the MON processing system, for example.

EI (Exposure Index): Exposure index

Meta: Whether metadata generated by CHU 10 is to be displayed in monitoring video Detail: ON/OFF of emphasis of outline Status: Whether to display setting value in monitoring video Marker: Whether to display center marker, marker that indicates display area recording video, etc. in monitoring video Zebra: Whether to add zebra pattern to area of luminance range designated by user It should be noted that these are mere examples.

Further, a common setting item may exist among the plurality of processing systems. In such a case, a block of the common setting item is arranged such that it crosses the plurality of lines corresponding to the plurality of processing systems. For example, in FIG. 2, 3 setting items of Status, Marker, and Zebra exist in both the VF processing system and the MON processing system. In this case, the block 44 corresponding to the setting item Status, the block 45 corresponding to the setting item Marker, and the block 46 corresponding to the setting item Zebra are displayed such that they cross the VF line 52 and the MON line 53. A setting value of each processing system is described in each of the blocks 44 to 46 respectively corresponding to the setting items common among the plurality of processing systems. As a result, it becomes possible to compare and check the setting values of the setting items common among the plurality of processing systems at a glance.

Furthermore, a setting item for which a common setting value needs to be set among the plurality of branched processing systems may exist when the line is branched. For example, in FIG. 2, the values set for the setting items EI and Meta need to be common between the VF processing system and the MON processing system. The blocks 41 and 42 of such setting items are arranged on the line right before the line is branched into the lines 52 and 53 of the processing systems, that is, on the longitudinal line 51*a* connecting the main line 51, the VF line 52, and the MON line 53 in FIG. 2. As a result, the user can easily grasp the setting items for which common setting values need to be set based on which block of the setting item is arranged on what line.

Next, an operation method for setting and changing values of the setting items will be described.

In the operation unit 19 of the CHU 10, a first rotary switch 22, a second rotary switch 23, and the like (see FIG. 1) are provided as means for scrolling the screen, switching the block to be a target of a focus 24, and setting a setting value. The screen is scrolled upwardly when the first rotary switch 22 is turned clockwise, and the screen is scrolled downwardly when the first rotary switch 22 is turned counterclockwise, for example. Accordingly, the processing system for which the block of the setting item is to be displayed can be switched. Further, the block to be the target of the focus 24 shifts in a certain order when the second rotary switch 23 is turned clockwise, and the block to be the target of the focus 24 sifts in the reverse order when the second rotary switch 23 is turned counterclockwise, for example. Moreover, the setting value of the setting item as a target of the focus 24 is switched when the second rotary switch 23 is pushed, for example.

Figure 3:
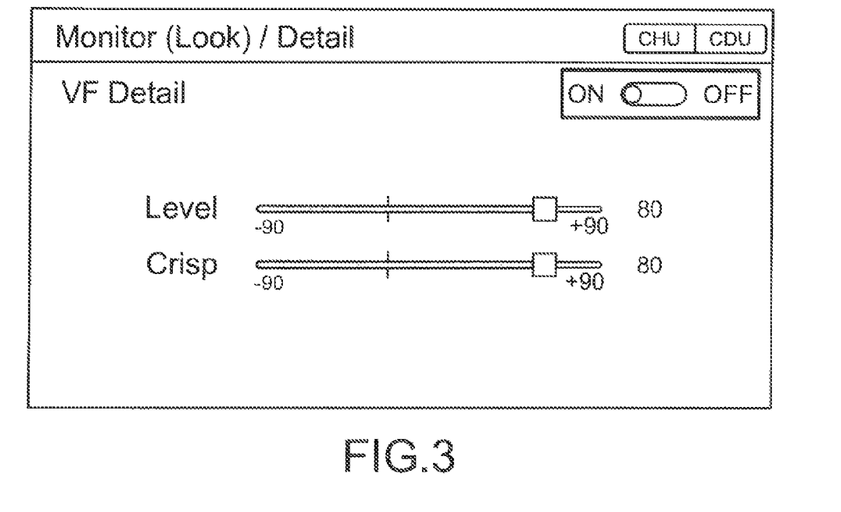
FIG. 3 is a diagram showing an example of a setting screen of specific parameter values of Detail.

Here, the values of the setting items Meta, Detail, Status, Marker, Zebra, and the like are switched between ON and OFF. A specific value of the setting item in the ON state is preset in another screen. FIG. 3 is a diagram showing an example of a setting screen of specific parameter values of Detail. The setting screen of specific parameter values of Detail is invoked by an operation of pressing the second rotary switch 23 twice or press-and-holding it while the setting item of Detail is being focused. As specific parameters of Detail, there are Level and Crisp. The parameter values of Level and Crisp are set by operating gauges. The selection and operation of the gauges are performed by turning and pressing the second rotary switch 23, for example.

Figure 4:
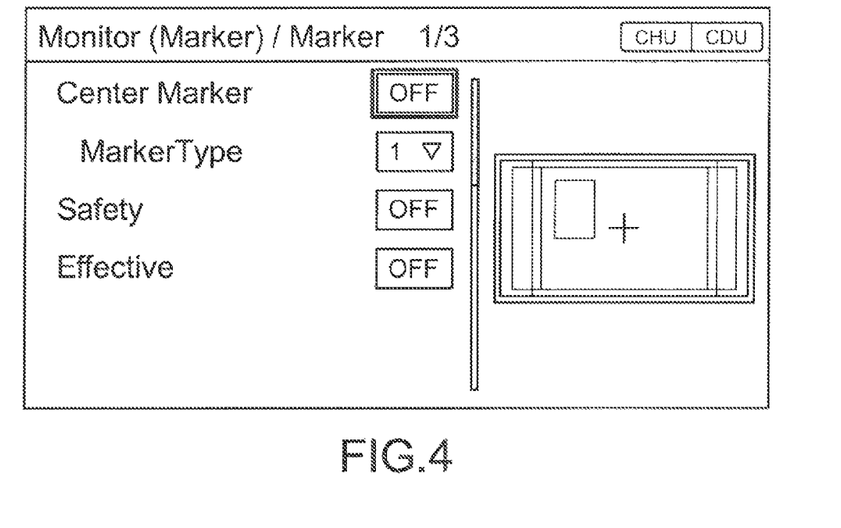
FIG. 4 is a diagram showing an example of a setting screen of specific parameter values of Marker.

FIG. 4 is a diagram showing an example of a setting screen of specific parameter values of Marker. As specific parameters of Marker, there are ON/OFF of center marker, marker type, ON/OFF of Safety, ON/OFF of Effective, and the like. The selection of such specific parameter values is also performed by turning and pressing the second rotary switch 23, for example.

As described above, in the setting GUI 30 of this embodiment, the processing systems are expressed as lines illustrated in parallel with one another along one of the biaxial directions allocated as the signal-flowing direction on the screen, and one or more blocks in which a name and setting value of a setting item of the corresponding processing system are described are arranged on the line of the processing systems. As a result, the relationship among the processing systems and the setting items can be viewed panoramically, and operability in checking and changing settings can be additionally improved.

Further, in the setting GUI 30 of this embodiment, when a setting item common among the plurality of processing systems exists, the block of the common setting item is arranged such that it crosses the plurality of lines respectively corresponding to the plurality of processing systems. As a result, it becomes possible to compare and check the setting value of the setting item common among the plurality of processing systems at a glance.

Furthermore, in the setting GUI 30 of this embodiment, when a setting item for which a common setting value needs to be set among the plurality of branched processing systems exists, the block of such a setting item is arranged on the line right before the line is branched into the lines of the processing systems. As a result, the user can easily grasp the setting item for which a common setting value needs to be set based on which block of the setting item is arranged on what line.

MODIFIED EXAMPLE 1

Next, Modified Example 1 of the first embodiment will be described.

Figure 5:
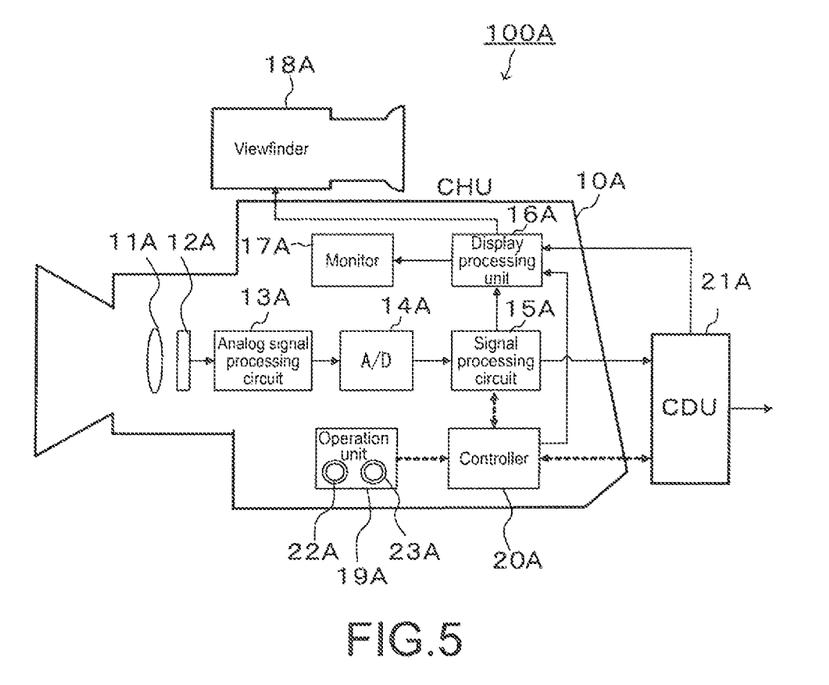
FIG. 5 is a block diagram showing a structure of an image pickup apparatus according to Modified Example 1.

As shown in FIG. 5, Modified Example 1 assumes a case where a CDU (Color Development Unit) 21A capable of carrying out RAW development processing on a video signal output from a CHU 10A is connected to the CHU 10A. The CDU 21A is a unit capable of carrying out a down conversion, a color conversion, and various other types of image processing in addition to a RAW data color development at a high quality.

Figure 6:
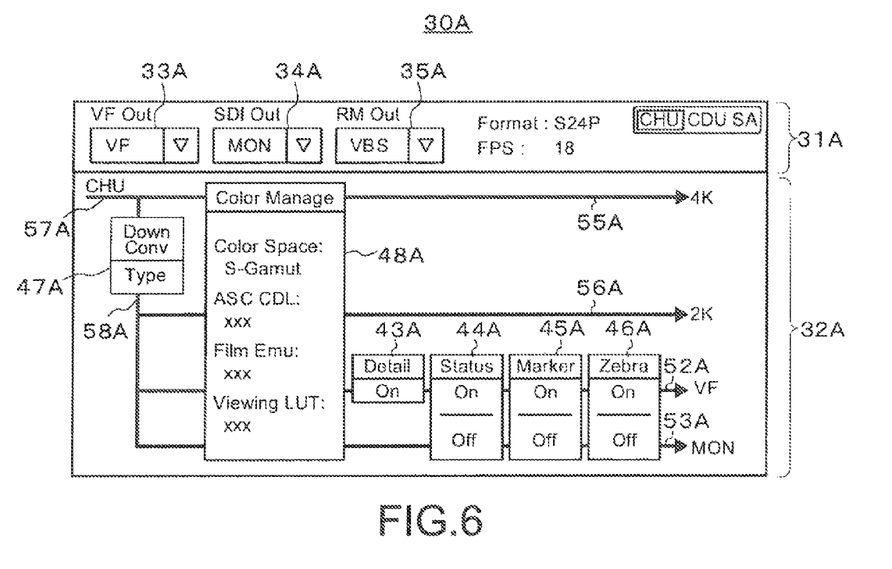
FIG. 6 is a diagram showing a setting GUI of Modified Example 1.

FIG. 6 is a diagram showing a state where blocks corresponding to setting items of a CDU processing system are displayed in a setting item display area 32A as the screen is scrolled by an operation to a rotary switch.

In the description in the setting item display area 32A, "CHU" refers to the CHU 10A. "4K" refers to a processing system for outputting a video signal having a 4K resolution (hereinafter, referred to as "4K resolution processing system"). "2K" refers to a processing system for outputting a video signal having a 2K resolution (hereinafter, referred to as "2K resolution processing system"). "VF" refers to the VF processing system. "MON" refers to the MON processing system.

In the setting GUI 30A, a 4K resolution line 55A expressing the 4K resolution processing system, a 2K resolution line 56A expressing the 2K resolution processing system, a VF line 52A, and a MON line 53A are illustrated in parallel with one another along one axial direction (e.g., abscissa direction) allocated as the signal-flowing direction on the screen. Further, original signals processed in the processing systems of the 4 lines 55A, 56A, 52A, and 53A are outputs of the CHU 10A. Therefore, the 4 lines 55A, 56A, 52A, and 53A are illustrated as lines branched from a line 57A indicating an output of the CHU 10A.

As setting items of the CDU processing system, there are a down converter, color management, and the like. Here, the down converter is used by 3 processing systems, that is, the 2K resolution line 56A, the VF line 52A, and, the MON line 53A. Therefore, a block 47A of a setting block of the down converter is arranged on a longitudinal branch line 58A right before the line is branched into the 2K resolution line 56A, the VF line 52A, and the MON line 53A. In this example, the color management is a setting item for which a common value needs to be set among the processing systems of the 4 lines 55A, 56A, 52A, and 53A. In this regard, a block 48A of a setting item of the color management is arranged such that it crosses the 4 lines 55A, 56A, 52A, and 53A.

Hereinafter, the values of the setting items of the down converter and the color management will be described.

As values of the setting item of the down converter, there are a value designating a high-quality down conversion in the CDU 21A and a value designating a simple down conversion in the CHU 10A.

The setting item of the color management is further categorized into setting items of a color space, an ASC CDL, a film emulation, a viewing LUT, and the like.

As the value of the setting item of the color space, there are "existing Sony camera", "DCI reference projector", "monitor of Rec 709" and the like that remove a distortion of a color range of an image sensor and set it to be an original wide color range for a camera.

The ASC CDL (The American Society of Cinematographers Color Decision List) is a format used for exchanging information on primary color grading defined by ASC among apparatuses and software. The ASC CDL adjusts a basic tone or color of an image by parameters of Slope, Offset, Lift, Power, and Saturation. These parameters are compatible among the apparatuses and software, and by applying the parameters, the same image can be reproduced by other apparatuses and software.

The film emulation is an image processing function for reproducing a color of a film for movies.

The viewing LUT (Look Up Table) is a table used for displaying a video of a color and tone close to a final video image on the monitor 17 of the viewfinder 18.

As described above, the present disclosure is applicable to display of various setting items of processing systems.

MODIFIED EXAMPLE 2

Next, Modified Example 2 will be described.

In Modified Example 2, even with the same processing systems, requisite setting items change in accordance with a photographing mode.

For example, there are a CINE mode, a CUSTOM mode, and the like as the photographing mode of the image pickup apparatus. The CINE mode is a mode that assumes a post-production task and in which shooting corresponding to an operation of a film camera can be performed. On the other hand, the CUSTOM mode is a mode in which an image can be treated in the field and a free video adjustment can be performed in the field by operating a paint function. Therefore, in the CUSTOM mode, the paint function is necessary as the setting item.

Figure 7:
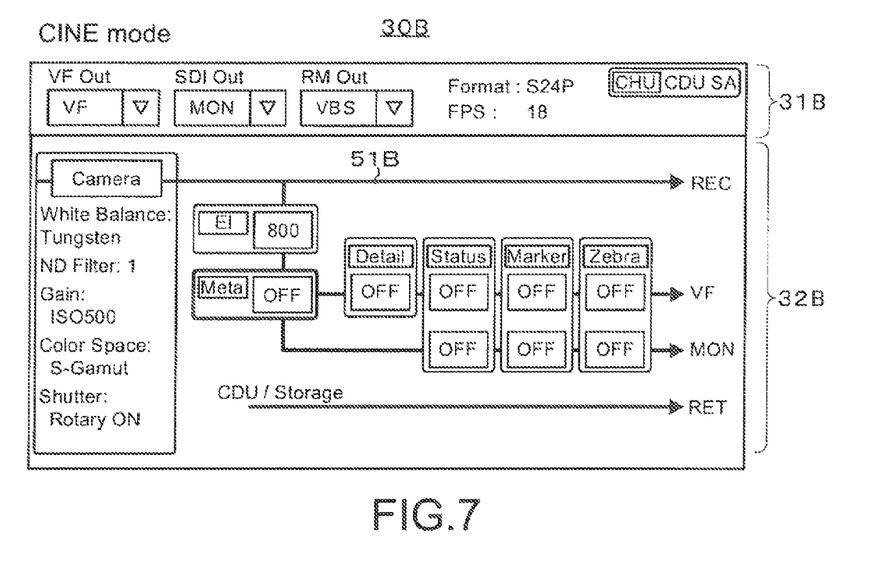
FIG. 7 is a diagram showing a setting GUI in a CINE mode according to Modified Example 2.
Figure 8:
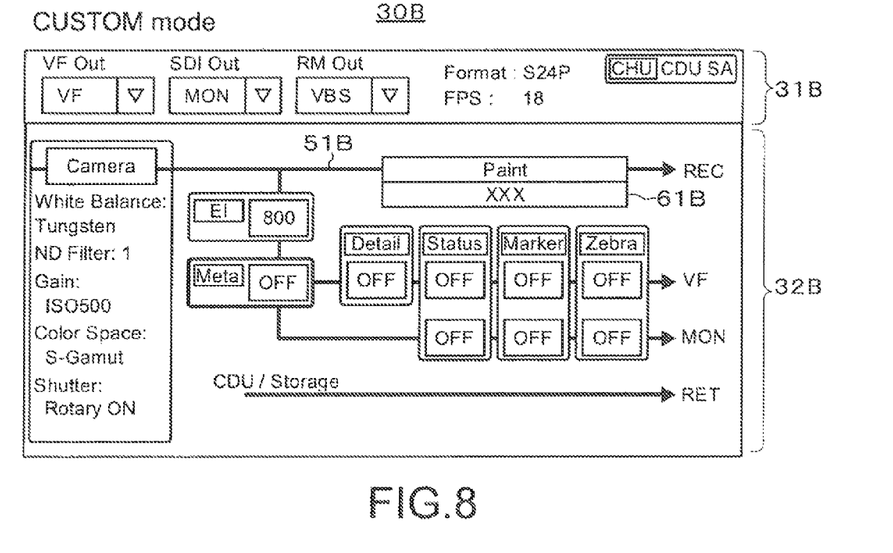
FIG. 8 is a diagram showing a setting GUI in a CUSTOM mode according to Modified Example 2.

FIG. 7 is a diagram showing a setting GUI 30B in the CINE mode. FIG. 8 is a diagram showing the setting GUI 30B in the CUSTOM mode. In Modified Example 2, when the CUSTOM mode is selected, in a setting item display area 32B of the setting GUI 30B, a block 61B of a setting item of paint that is not displayed when the CINE mode is selected appears on a main line 51B. As described above, in Modified Example 2, since blocks of requisite setting items can be displayed in accordance with the photographing mode even with the same processing systems, it is possible to effectively prevent setting leaks from occurring.

It should be noted that although Modified Example 2 has described the case where a block of a requisite setting item appears or disappears in accordance with a switch of the photographing mode, the present disclosure is of course applicable to a case where a block of a requisite setting item appears or disappears in accordance with a switch of various modes other than the photographing mode. Moreover, it is also possible to cause, when a setting value of a certain setting item cannot be changed or needs to be changed based on a setting value of another setting item among a plurality of setting items having a dependency, the user to recognize the fact using display of the setting GUI or inhibit the setting value from being changed.

Further, although the processing systems are expressed by the lines illustrated along the abscissa direction in the screen, the processing systems may be expressed by lines along the ordinate direction. In addition, the direction of the lines does not necessarily need to be along the abscissa or ordinate direction of the screen and may be set to be oblique in the screen.

Furthermore, although the embodiment of a case where the present disclosure is applied to an image pickup apparatus has been described, the present disclosure is also applicable to an information processing apparatus other than the image pickup apparatus as long as the apparatus includes a plurality of processing systems with respect to information on signals and the like and setting items for each of the processing systems. For example, the present disclosure can be effectively used in an information processing apparatus such as a recording apparatus, a game machine, a cellular phone, a player apparatus, and a television.

It should be noted that the present disclosure can also take the following structure.

(1) An information processing apparatus, including:
a GUI generation unit configured to generate GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged; and
a display processing unit configured to display the generated GUI data on the screen.

(2) The information processing apparatus according to (1) above,
in which the GUI generation unit generates GUI data that expresses a fact that common information is to be a processing target of the plurality of processing systems by a branch of the lines.

(3) The information processing apparatus according to (2) above,
in which the GUI generation unit arranges the block of the setting item for which a common setting value needs to be set among the plurality of branched processing systems on a line right before the line is branched into a line of each of the processing systems.

(4) The information processing apparatus according to any one of (1) to (3) above,
in which the GUI generation unit arranges the block of the setting item common among the plurality of processing systems such that the block crosses the plurality of lines respectively corresponding to the plurality of processing systems.

The present disclosure contains subject matter related to that disclosed in Japanese Priority Patent Application JP 2011-086601 filed in the Japan Patent Office on Apr. 8, 2011, the entire content of which is hereby incorporated by reference.

It should be understood by those skilled in the art that various modifications, combinations, sub combinations and alterations may occur depending on design requirements and other factors insofar as they are within the scope of the appended claims or the equivalents thereof.

What is claimed is:

1. An information processing apparatus comprising:
a GUI generation unit configured to generate GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged,
wherein the GUI generation unit generates GUI data that expresses a fact that common information is to be a processing target of the plurality of processing systems by a branch of the lines; and
a display processing unit configured to display the generated GUI data on the screen.

2. The information processing apparatus according to claim 1,
wherein the GUI generation unit arranges the block of the setting item for which a common setting value needs to be set among the plurality of branched processing systems on a line right before the line is branched into a line of each of the processing systems.

3. The information processing apparatus according to claim 2,
wherein the GUI generation unit arranges the block of the setting item common among the plurality of processing systems such that the block crosses the plurality of lines respectively corresponding to the plurality of processing systems.

4. The information processing apparatus according to claim 3,
wherein the GUI generation unit displays a setting value of each of the processing systems in the block of the setting item common among the plurality of processing systems.

5. A setting GUI display method, comprising:
generating, by a GUI generation unit, GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged,
wherein the GUI data expresses a fact that common information is to be a processing target of the plurality of processing systems by a branch of the lines; and
displaying, by a display processing unit, the generated GUI data on the screen.

6. An image pickup apparatus, comprising:
an image pickup unit configured to pick up an image of an object;
a GUI generation unit configured to generate GUI data in which one of two mutually-orthogonal directions on a screen is allocated as a direction in which information flows, a plurality of processing systems for information processing are expressed as a plurality of lines along the one direction, and one or more blocks in which a name and setting value of one or more setting items of the processing system corresponding to at least one of the lines are displayed on the line are arranged,
wherein the GUI generation unit generates GUI data that expresses a fact that common information is to be a processing target of the plurality of processing systems by a branch of the lines; and a display processing unit configured to display the generated GUI data on the screen.

* * * * *